United States Patent [19]

Kita

[11] Patent Number: 5,071,391

[45] Date of Patent: Dec. 10, 1991

[54] STEPLESS SPEED CHANGING HYDROSTATIC TRANSMISSION

[75] Inventor: Yasuo Kita, Kyoto, Japan

[73] Assignee: Shimadzu Corporation, Kyoto, Japan

[21] Appl. No.: 123,478

[22] Filed: Nov. 20, 1987

[30] Foreign Application Priority Data

Nov. 21, 1986 [JP] Japan .................................. 61-279386
Mar. 21, 1987 [JP] Japan .................................. 62-78847

[51] Int. Cl.$^5$ .......................................... F16H 47/04
[52] U.S. Cl. ........................................................ 475/80
[58] Field of Search ................. 74/677, 681, 687, 718, 74/732, 339; 475/80

[56] References Cited

U.S. PATENT DOCUMENTS

| 3,286,541 | 11/1966 | Dearnley et al. | 74/339 |
| 3,478,851 | 11/1969 | Smyth et al. | 74/339 X |
| 3,503,280 | 3/1970 | Bopp | 74/339 X |
| 3,673,890 | 7/1972 | Crooks | 74/681 |
| 3,924,484 | 12/1975 | Richards | 74/339 X |
| 3,969,958 | 7/1976 | Miyao et al. | 74/687 |
| 3,982,448 | 9/1976 | Polak et al. | 74/687 |
| 3,988,949 | 11/1976 | Weseloh et al. | 74/687 |
| 3,990,327 | 11/1976 | Margolin | 74/687 |
| 4,181,041 | 1/1980 | Frost | 74/687 |
| 4,196,644 | 4/1980 | Orshansky, Jr. et al. | 74/687 |
| 4,563,914 | 1/1986 | Miller | 74/687 |
| 4,660,707 | 4/1987 | Sadanori et al. | 74/339 X |
| 4,750,381 | 6/1988 | Kita et al. | 74/687 |

FOREIGN PATENT DOCUMENTS

| 0004045 | 9/1971 | European Pat. Off. | 74/687 |
| 0195452 | 9/1986 | European Pat. Off. | 74/687 |
| 0234135 | 9/1987 | European Pat. Off. | |
| 0234136 | 9/1987 | European Pat. Off. | |
| 0235466 | 9/1987 | European Pat. Off. | |
| 2274837 | 1/1976 | France | |
| 0059060 | 3/1986 | Japan | 74/687 |
| 0059061 | 3/1986 | Japan | 74/687 |
| 0298495 | 6/1971 | U.S.S.R. | 74/687 |

OTHER PUBLICATIONS

Hydrostatic Engineering, compiled by Tomoo Ishihara, published by Asakura-Shoten on Jun. 10, 1968.
Theory & Practice of Piston Pump-Motor, by Sadao Ishihara (Dr. Engineering at Sagami Industrial University), published by Ohm Sha on May 20, 1979.

Primary Examiner—Dirk Wright
Attorney, Agent, or Firm—Armstrong, Nikaido, Marmelstein, Kubovcik & Murray

[57] ABSTRACT

A stepless speed change gear comprising a differential gear mechanism forming high and low speed side mechanical transmission systems, a variable speed hydraulic transmission mechanism consisting of two hydraulic pumps/motors joined with the differential gear mechanism and two synchromesh type intermittent on-off power mechanisms for high and low speed engagement of the transmission system outputs. When connection is made to the high speed side synchromesh type intermittent power on-off mechanism at the time when the high speed side rotational speed approaches the low speed side rotational speed with the low speed side synchromesh type intermittent power on-off mechanism connected, the high speed side synchromesh type intermittent power mechanism will automatically be connected. By switching the low speed side synchromesh type intermittent power on-off making mechanism into its non-connected state, switching from low to high speed mode may be made.

1 Claim, 5 Drawing Sheets

FIG. 7

STEPLESS SPEED CHANGING HYDROSTATIC TRANSMISSION

BRIEF SUMMARY OF THE INVENTION

The present invention relates to a stepless speed change gear making use of a hydraulic pump/motor, that is, a so-called hydrostatic transmission gear (HST). A HST gear is excellent in stepless speed change characteristic, but its efficiency is not always high and the speed range is not satisfactorily wide. To overcome these problems, there has been developed a stepless speed change gear designed to have power transmission shared by a HST and a differential gear mechanism, thereby enabling the aforementioned HST's stepless speed changeability and the high efficiency of gear transmission {references: Hydraulic Engineering (edited by Tomoo Ishihara, Asakura Book Store), Theory and Practical Use of Piston Pump Motor (Sadao Ishihara, Corona Company)}.

Thus, the stepless speed change gear equipped with a differential gear mechanism having first, second and third input/output ends forms a low speed side mechanical transmission system between the first and the second input/output ends and a high speed side mechanical trasmission system between the first and the third input/output ends, has a stepless speed change mechanism which while having an input/output shaft of one of the hydraulic pumps/motors joined to the second input/output ends of the differential gear mechanism, has an input/output shaft of the other hydraulic pump/motor joined to the aforementioned third input/output end, and forms a variable speed hydraulic transmission system with two pumps/motors and a low speed side clutch for connecting or disconnecting the transmission end of the aforementioned low speed side mechanical transmission system on or from a common rotary element installed on the input/output sides and a high speed side clutch for connecting or disconnecting the transmission end on or from the aforementioned common rotary element, so that by switching the aforementioned two clutches, either low or high speed mode may be selected. Heretofore, for the clutch, a dry or wet type multiple disc clutch which is switchable by oil pressure, etc., has been in use. As used herein, in the description which follows and in the appended claims "input/output" defines an element for inputting power or outputting power.

The multiple disc clutch tends to be bulky. Accordingly, incorporating such clutches into the mode switching section raises the problem of making miniaturization and weight reduction of the equipment as a whole, difficult. In clutches of this type, which are designed to make smooth switching of power transmission states, taking advantage of the slip between each clutch disc with a large area, the energy loss at the switching time is substantial. Such clutch discs are susceptible to abrasion and time and labor are required for maintenance.

Further, in order to eliminate shock at the mode switching time, transmission torque (control oil pressure) of both high and low clutches require precise mutual control and in time dependent manner, for which trial and error adjustment is required. Heating and abrasion due to clutch slipping at the switching time and adjustment shift resulting from oil wetting, or viscosity change, and other problems, arise. In such a device, it is also difficult to predict an optimal condition for all running condition which involve wide changes of torque and speed.

The present invention has as its object solving the problems as above-described and has adopted the following composition.

The stepless speed change gear according to the present invention is characterized by comprising a differential mechanism having a first, second and third input/output ends and forming a low speed side mechanical transmission system which passes between the first and the second input/output ends and a high speed side mechanical transmission system which passes between the first and the third input/output ends, a hydraulic transmission mechanism which while having an input/output shaft of one of the hydraulic pumps/motors joined to the second input/output end of the differential gear mechanism, has an input/output shaft of the other hydraulic pump/motor joined to the aforementioned third input/output end, and forming a variable speed hydraulic transmission system with such two pumps/motors; a low speed side synchromesh type intermittent power on-off mechanism for connecting or disconnecting the transmission end of the aforementioned low speed side mechanical transmission system on or from a common rotary element installed on the input/output sides; and high speed side synchromesh type intermittent power on-off mechanism for connecting or disconnecting the transmission end on or from the aforementioned common rotary element.

A more preferable stepless speed change gear is composed as follows:

The stepless speed change gear is characterized by comprising a first, second and third input/output ends and is equipped with a differential gear mechanism forming a low speed side mechanical transmission system which passes between the first and the second input/output ends and a high speed side mechanical transmission system which passes between the first and the third input/output ends;

a stepless speed change mechanism which, while having one of its input/output ends joined to the second input/output end of the lower speed differential gear mechanism, has the other input/output ends joined to the aforementioned third input/output end;

a low speed side synchromesh type intermittent power on-off mechanism for engaging or disengaging the transmission end of the aforementioned low speed side mechanical type transmission system on or from a common rotary element installed on the input/output side by way of engagement or disengagement of a sleeve;

a high speed side synchromesh type intermittent power on-off making mechanism for engaging or disengaging the transmission end of the aforementioned high speed side mechanical transmission system on or from the aforementioned common rotary element by way of engagement or disengagement of a sleeve;

and a switching mechanism for switching the engagement-disengagement state of the aforementioned intermittent power on-off mechanism by continuing the depression in the engaging or disengaging direction until the aforementioned sleeve is actually operated.

As the aforementioned synchromesh type intermittent power on-off making mechanism, for example, an inertia lock type which is finding use in rolling stock transmission or constant load type is applicable.

With such a composition, in low speed mode, the transmission terminal of the low speed side mechanical transmission system which passes between the first and the second input/output ends of the differential mechanism is joined to a common rotary element installed on the input/output side through a low speed side synchromesh type intermittent power on-off mechanism, and part of the inputted power is directly outputted through the low speed side mechanical transmission system. The balance of the inputted power is led to the output side through a hydraulic transmission system formed by the hydraulic transmission mechanism. In this instance, while the hydraulic pump/motor on one side works as a motor, the hydraulic pump/motor on the other side function as a pump.

In the high speed mode, the transmission end of the high speed side mechanical transmission system, which passes between the first and the third input ends of the differential mechanism, is joined to the aforementioned common rotary element though the high speed side synchromesh type intermittent power on-off mechanism. Part of the inputted power is directly outputted through such high speed mechanical transmission system. The balance of the power is fed to the output side through a hydraulic transmission system formed by the hydraulic transmission mechanism. In this instance, however, the roles of the aforementioned respective hydraulic pumps/motors as a pump or a motor are interchanged from the previous embodiment.

The switching from the aforementioned low speed mode to the aforementioned high speed mode is made in the following manner: In the state of only the low speed side synchromesh type intermittent power on-off mechanism being connected, operation is applied to the effect that connection is made to the high speed side synchromesh type intermittent power on-off mechanism when the rotational speed of the transmission end of the high speed side mechanical transmission system approaches the rotary speed of the transmission end of the low speed side mechanical power transmission system. Then, as the rotational speeds of the aforementioned two transmission ends become equal, the high speed side synchromesh type intermittent power on-off mechanism is automatically brought into connected state, so that the transmission end of the high speed side mechanical power transmission system is coupled to the common rotary element. Thereafter, the low speed side type intermittent power on-off mechanism is switched into its disengaged state; then, the device is in the high speed mode. When switching from the high speed mode to the low speed mode, it is only necessary to reverse the operation.

The switching operation between the low and the high speed sides may be performed, for example, in the following manner:

First, the sleeve of the high speed side intermittent power on-off mechanism is pressed, with an appropriate force in its engaging direction by a switching mechanism, to its stand-by posture. Then, the aforementioned sleeve will move, in its engaging direction, when the rotational speeds of the aforementioned two transmission terminals are equalized by the action of the blocker ring of the power on-off mechanism. Then the high speed side mesh type intermittent power on-off mechanism is automatically brought into its connected state and the transmission end of the high speed side mechanical power transmission system is coupled to the common rotary element. Thereafter, in order to switch either of the synchromesh type intermittent power on-off mechanism to its disengaged state, the sleeve of the power transmission mechanism to be disengaged continues to be pressed in its disengaging direction with an appropriate force, to be in its stand-by posture. Then, the speed change ratio of the aforementioned stepless speed change mechanism is corrected in the direction of decreasing the transmission torque of the intermittent power on-off mechanism. The moment when the transmission torque of the intermittent power on-off mechanism becomes nearly zero, the sleeve moves in its disengaging direction, thereby interrupting the transmission of torque.

Because of the composition of this invention, as hereabove-described, the following effects are derived:

First, because bulky multiple disc, clutches, etc., are unnecessary, size and weight reduction is feasible and moreover, maintenance is facilitated.

Besides, slip clutch type control is unnecessary, so that smooth, unforcible mode switching may be made without using high accuracy control system. Accordingly, adjustment based on trial and error approach is not required and moreover, adjustment shift caused by change in oil moisture, etc., is not required.

Further, if a synchromesh type intermittent on-off power mechanism is used in combination with a switching mechanism matched in characteristics to the former mechanism, switching of modes may be ensured without use of a high precision rotational speed detector, etc., and ideal shock free switching operation may be attained, even under traveling conditions involving large change in torque or speed.

DETAILED DESCRIPTION OF THE INVENTION

Figure 1:
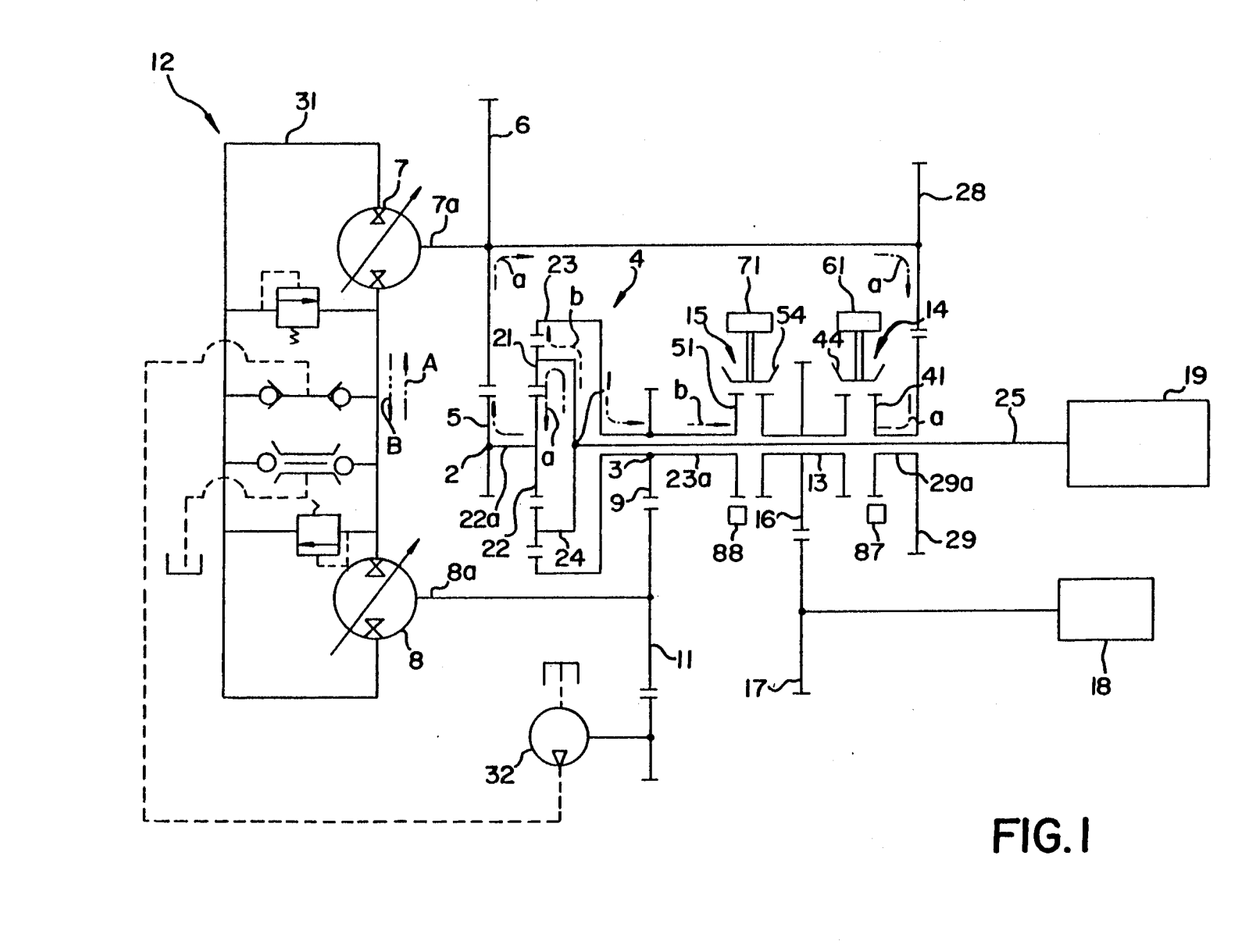
FIG. 1 is a schematic diagram of the apparatus and controls.

In the following, an embodiment of this invention will be described in reference to the accompanying drawings:

The stepless speed change gear of this invention is equipped with a differential gear mechanism 4 having, as schematically shown in FIG. 1, a first, second and third input/output ends 1, 2 and 3 and forming a low speed mechanical transmission system "a" which passes between the first and the second input/output ends 1 and 2 and a high speed mechanical transmission system "b" which passes between the first and the third input/output end 1 and 3, a stepless speed change mechanism 12 which while having an input/output shaft 7a (one of the input/output ends) of one of the hydraulic pumps/motors 7 joined to the second input/output end 2 of differential gear mechanism 4 through gears 5 and 6, has an input/output shaft 8a (the other input/output end) of the other hydraulic pump/motor 8 joined to the aforementioned third input/output end 3 through gears 9 and 11, forming a variable speed hydraulic transmission system A and B by these two pumps/motors 7 and 8, and a low speed synchromesh type intermittent power on-off mechanism 14 for engaging or disengaging a transmission end of the aforementioned low speed side mechanical transmission system "a" on or from a center boss 13 of a commom rotary element and a high speed side synchromesh type intermittent power on-off mechanism 15 for contacting or removing the transmission end of the aforementioned high speed side mechanical transmission system "b" on or from the aforementioned center boss 13. The center boss 13 is connected to an output shaft 18 through gears 16 and 17.

The differential gear mechanism is a planetary gear system having a sun gear 22 disposed inside a plurality of planetary gears 21 which are equally distributed along the circumferential direction and a ring gear 23 meshed with gears 21. The center of a gear retainer 24 which bears the shaft of each planetary gear 21 above-mentioned is used as the aforementioned first input/output end 1 and to this input/output end 1, the input/output shaft 25 coupled to the power source 19 is joined. Then a distal end of the supporting shaft 22a of the aforementioned sun gear 22 is used as the aforementioned second input/output end and to this input/output end 2, the aforementioned gear 5 is fixed. Further, a distal end of the boss part 23a of the aforementioned ring gear 23 is used as the aforementioned third input/output end 9 and on this input/output end 3, the aforementioned gear 9 is provided. Thus the aforementioned low speed side mechanical transmission system "a" is composed of the aforementioned planetary gear 21, sun gear 22, gear 5, gear 6, gear 28 and gear 29, with the boss part 29a of the gear 29 playing the part of the transmission end of said mechanical transmission system "a". On the other hand, the aforementioned high speed side mechanical transmission system "b" is composed of the aforementioned planetary gear 21 and ring gear 23, with the boss part 23a of the aforementioned ring gear 23 playing the role as a transmission end of mechanical transmission system "b".

The aforementioned stepless speed change mechanism 12 is composed of a variable capacity type hydraulic pump/motor 7 and another variable capacity type hydraulic pump/motor 8, connected in series through a hydraulic circuit 31, similar to a conventional HST in which, while the input/output shaft 7a of the aforementioned hydraulic pump/motor 7 is connected to the supporting shaft 22a of the aforementioned sun gear 22 through gears 6 and 5, the input/output shaft 8a of the aforementioned hydraulic pump/motor 8 is connected to the aforementioned ring gear 23 through gears 11 and 9. Numeral 32 denotes a boost pump connected to the aforementioned hydraulic circuit 31.

Figure 2:
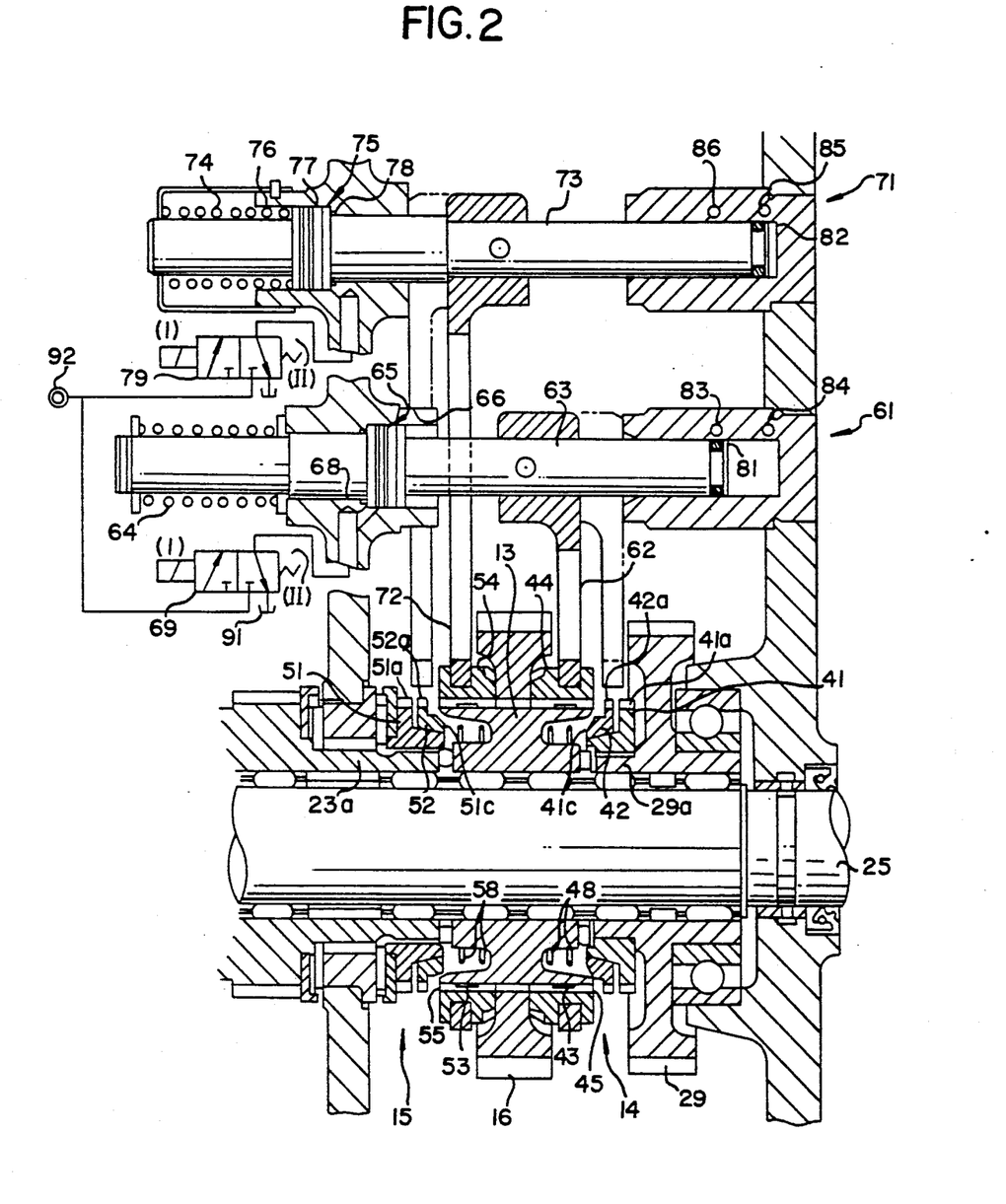
FIG. 2 is a sectional view showing a synchromesh type intermittent power on-off mechanism and switching mechanism section.

Further, the low speed side synchromesh type intermittent power on-off making mecnanism 14, FIG. 2, is of the so-called inertia locking type having dog gear 41 and blocker ring 42 arranged between one end of the aforementioned center boss 13 and the boss part 29a of the gear 29 used as the transmission end of the aforementioned low speed side mechanical transmission system "a". The dog gear 41 is fixed on the boss part 29a of the aforementioned gear 29 and has on its outer perimeter teeth 41a with its tip portion 41b turned toward the aforementioned center boss 13. On the outer periphery of the boss portion of the dog gear 41, there is formed a cone clutch surface 41c having diameters gradually diminishing toward the center boss 13 and on this cone clutch surface 41c, the aforementioned blocker ring 42 is slidably engaged. The blocker ring 42 has on its outer periphery teeth 42a, FIG. 3, with their tip portion 42b turned toward the center boss 13 and has cavities 42c formed in a plurality of places. On the outer periphery of the center boss 13, there is formed a spline 43 having identical effective diameter and pitch to those of the teeth 41a of the aforementioned dog gear and the teeth 42a of the blocker ring 42, and to this spline 43, another spline 45 curved in the inner periphery of sleeve 44 is meshed slidably in the axial center direction. At the location corresponding to the aforementioned cavity 42c of this center boss 13, there are provided notched grooves 46 opened at the end surface, and to each notched groove 46, the synchronizer key 47 is respectively engaged. The width of the synchronizer key 47 is set to a value nearly equal to the opening width in the circumferential direction of the aforementioned notched groove 46. Accordingly, these synchronizer keys 47 are slidable only in the axial center direction and radial direction of the center boss 13. Each synchronizer key 47 is urged outward by a spring 48, for its distal end to be inserted in the cavity 42c of the aforementioned blocker ring 42. On the outer surface of each synchronizer key 47, there is provided a protrusion 47a; this protrusion 47a is elastically engaged in a shallow recess 45a provided on the inner perimeter of the spline 45 of the aforementioned sleeve 44. In the outer periphery of the aforementioned sleeve 44, an annular groove 44a is formed and in this annular groove 44a, a shifter 62, FIG. 3, of the later described switching mechanism 61 is engaged.

Figure 3:
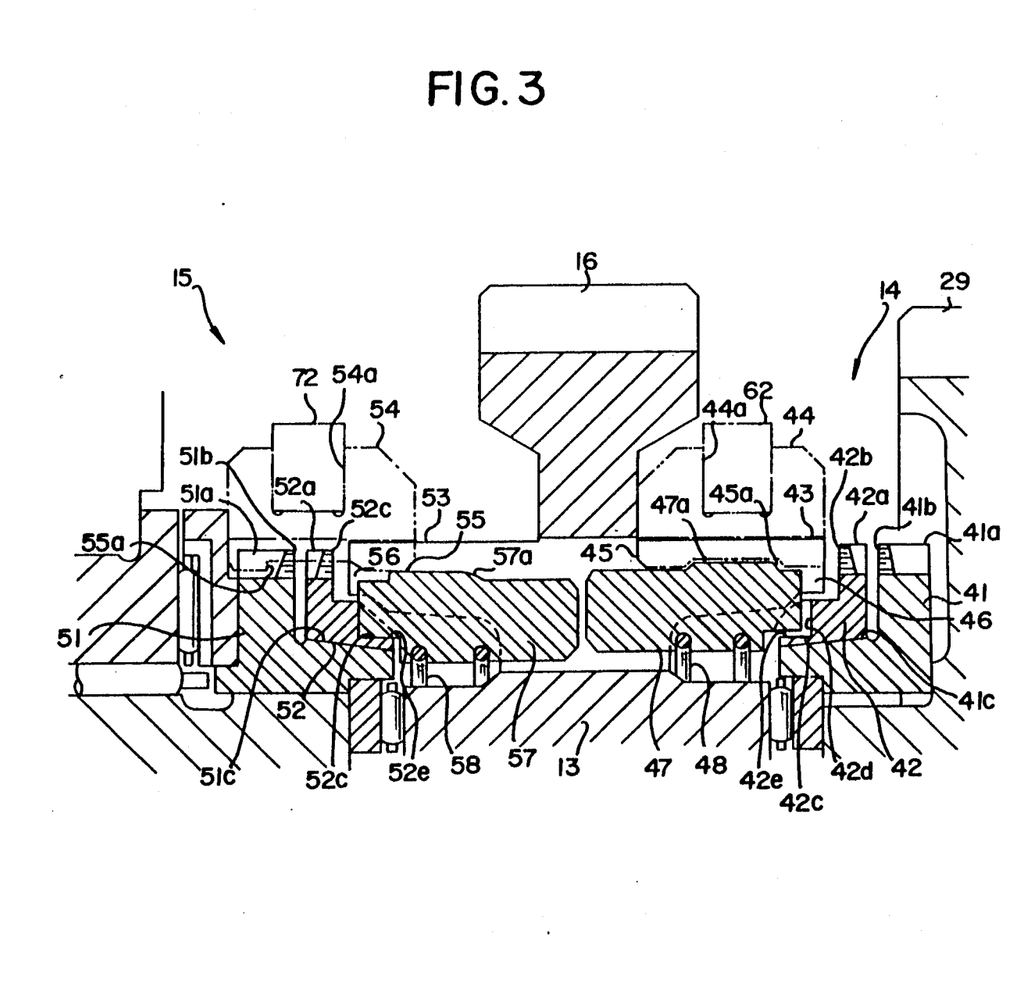
FIG. 3 is a partial sectional view showing, in an enlarged view, a synchronizer key arranged section of the synchromesh type intermittent power on-off making mechanism.
Figure 4:
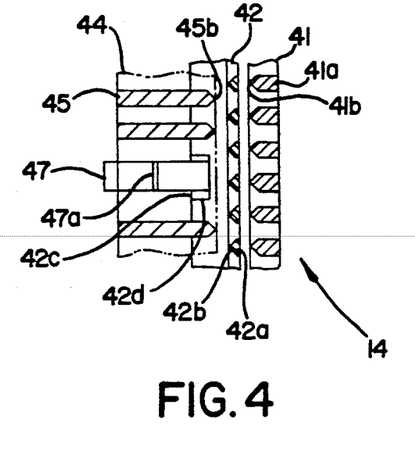
FIGS. 4, 5 and 6 are views for expansion of actions.

The operation of this synchromesh type intermittent power on-off making mechanism 14 is explained as follows: In the opened position shown in FIGS. 2 and 3, the recess 45a of spline 45 provided on sleeve 49 and the protrusion 47c of the synchronizer key 47 are engaged with each other and the distal end of said synchronizer key 47 is loosely inserted in the cavity 42c of the blocker ring 42. A switching operation may be made from this state by continuously urging the sleeve 44 rightwards, FIG. 2, (engaging direction), as seen in this drawing by means of the later described low speed side switching mechanism 651. Thus as the sleeve 44 is moved toward the blocker ring 42 by means of the urging force of the aforementioned switching mechanism, first, the distal end of the synchronizer key 47 comes in contact with the end surface 42d of the cavity 42c of the blocker ring 42 (see FIG. 4.), whereby this blocker ring 42 may be pressured onto the cone clutch surface 41c of the dog gear 41, FIG. 2. As a result, the aforementioned blocker ring 42 tends to follow the dog gear 41. Then as the aforementioned sleeve 44 is further moved rightward, as seen in FIG. 4, from this state, the protrusion 47a of the aforementioned synchronizer key 42 is disengaged from the recess 45a provided on the inner periphery of this sleeve 44, then, the synchronizer key 47 is pressured inward by the inner periphery of the sleeve 44. Therefore, the aforementioned synchronizer key 47 is further pressured onto the cone clutch surface 41c of the dog gear 41; consequently, a powerful mutual frictional force is exerted between this blocker ring 42 and the dog gear 41. Accordingly, the aforementioned blocker ring 42 is urged to a position, being a position most relatively displaced from the center boss 13, that is, a position where an inside side surface of the cavity part 42c abuts on the side surface of the synchronizer key 47

Figure 5:
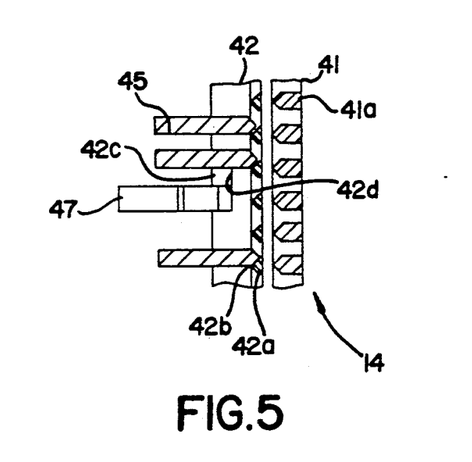
Figure 6:
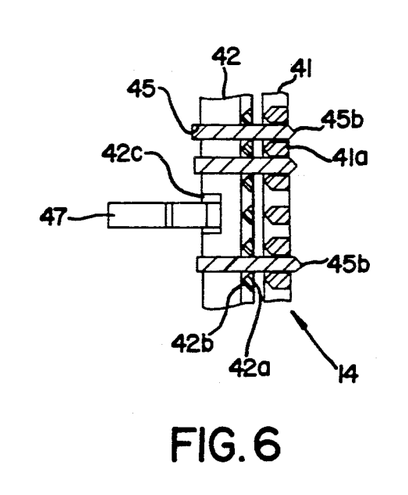

(see FIG. 5). At this position, the bevels forming the tip 42b of the teeth 42a of the aforementioned blocker ring 42 abut each other, thereby preventing the sleeve 44 from further rightward movement, as seen in the aforementioned figure. Under this state if the relative rotational speed between the aforementioned dog gear 41 and aforementioned center boss 13 diminishes, the frictional force exerted from the cone clutch surface 41c onto the aforementioned blocker ring 42 will decrease. On this account, at a stage where the frictional force has been nearly extinguished, with the revolution of the aforementioned dog gear 41 and that of the aforementioned center boss 13 nearly synchronized, it becomes possible for the aforementioned sleeve 44 to push back the blocker ring 42 by the guiding action of the bevels of the tips 42b and 45b to the direction reverse to that in which it was displaced by the frictional force and, as a consequence, the sleeve 44 will advance, so that its spline 45 will engage with the teeth 41a of the aforementioned dog gear 41 (see FIG. 6).

On the other hand the high speed side synchromesh type intermittent power on-off making mechanism 15 has dog gear 51 and synchronizer ring 52 arranged between the other end of the aforementioned center boss 13 and the boss 3a of the ring gear 23 which forms a transmission end of the aforementioned high speed side mechanical transmission system b. The dog gear 51 is securely held on the boss 23a of the aforementioned ring gear 23 and has, on its periphery, teeth 51a with their tips 51b turned toward the aforementioned center boss 13. On the outer periphery of the boss of this dog gear 51, FIG. 2, there is formed a cone clutch surface 51c which is gradually tapered toward the center boss 13. On this cone clutch surface 51c, the aforementioned beacher ring 52 is slidably engaged on this cone clutch surface 51a. The beacher ring 52 has on its periphery, teeth 52a with the tips 52b thereof turned toward the center boss 13 and at a plurality of parts of its end, cavities 52c are formed. On the other hand, on the outer periphery of the center boss 13, there is formed a spline 53 having the same effective diameter and pitch as those of the teeth 51a of the aforementioned dog clutch 51 and the teeth 52a of the beacher ring 52; with this spline 53, a spline 55 carved in the inside periphery of the sleeve 54 is slidably geared in the axial direction. At the positions corresponding to the aforementioned cavities 52c of this center boss 13, there are provided notched grooves 56 opening to the end and in each notched groove, each synchronizer key 57 is engaged. The width of the synchronizer key 57 is preset to be nearly equal to the opening width in the circumferential direction of the aforementioned notched groove 56. Accordingly, these synchronizer keys 57 are slidable only in the axial and radial directions of the center boss 13. Each synchronizer key 57 is urged outward by a spring 58 and its tip is inserted in the cavity 52c of the aforementioned beacher ring 52. There is provided a protrusion 57a on the outer surface of each synchronizer key 57 and this protrusion 57a is elastically engaged with a shallow recess 55a provided in the internal periphery of the spline 55 of the aforementioned sleeve 54. In the external periphery of the aforementioned sleeve 54, FIG. 3, an annular groove 54a is formed and in this annular groove 54a, shifter 72 of a switching mechanism 71 described later is engaged.

Thus this high speed synchromesh type intermittent power on-off making mechanism 15 is urged by a later described high speed side switching mechanism, to effect intermittent power on-off making by exerting the similar action as the aforementioned low speed mechanism.

Next, composition of the above described two switching mechanisms 61 and 71 is described:

First the low speed side switching mechanism 61, FIG. 2, is equipped with shifter 62 with its distal end engaged with sleeve 44 of the low speed synchromesh type intermittent power on-off making mechanism 14, slide shaft 63 which is movable forwards and backwards in a direction parallel to the axial center of the aforementioned sleeve 44, while holding the root end of this shifter 72, a spring 64 for urging this slide shaft 63 leftward (removing direction), as seen in FIG. 2, and hydraulic actuator 65 for urging the aforementioned slide shaft 63 rightward (engaging direction), as seen in this figure. The hydraulic actuator 65 has cylinder bore 66 having a larger diameter than that of the slide shaft 63 formed in casing wall 49 holding the aforementioned slide shaft 63 and in the internal periphery of the cylinder bore 66, a piston 66 formed integrally with the aforementioned slide shaft 63 is slidably engaged, the actuator being of a design such that a pressure chamber 68 formed inside the cylinder bore 66 may be selectively connected to a tank 91 or constant oil pressure source 92 through a solenoid valve 69.

The high speed side switching mechanism 71 is equipped with shifter 72 with its distal end engaged with sleeve 54 of high speed side synchromesh type intermittent on-off making mechanism 15, slide shaft 73 which is moveable forwards and backwards in a direction parallel with the axial center of the aforementioned sleeve 54, while holding the root end part of this shifter, a spring 74 for urging the slide shaft 73 rightward in FIG. 2 (removing direction), and hydraulic actuator 75 for urging the aforementioned slide shaft 73 leftward (engaging direction), as seen in FIG. 2. The hydraulic actuator 75 is of a design such that in the casing wall 45 which is holding the aforementioned slide shaft 73, a cylinder bore 76 having a larger diameter than that of the slide shaft 73 is formed. In the internal periphery of this cylinder bore 76, piston 77, formed integrally with the aforementioned slide shaft 73 is slidably engaged therewith and a pressure chamber 78 formed inside the cylinder bore 73 may be selectively connected to tank 91 or constant pressure hydraulic source 9 through a solenoid valve 79.

Numerals 81 and 82 denote magnets installed at an end part of each of the aforementioned slide shafts 63 and 73; 83 and 85, lead switches for disengaging position detection which make the switching upon sensing approaching magnets 81 and 82; and 84 and 86, similarly lead switches for engaging position detection which make switching upon sensing approaching magnets.

Numeral 87, FIG. 1, designates a rotational speed detector for detecting a rotational speed of the transmission and of low speed side mechanical type transmission system "a"; and 88, another rotational speed detector for detecting the rotational speed of the transmission end of the high speed side mechanical transmission system "b".

Figure 7:
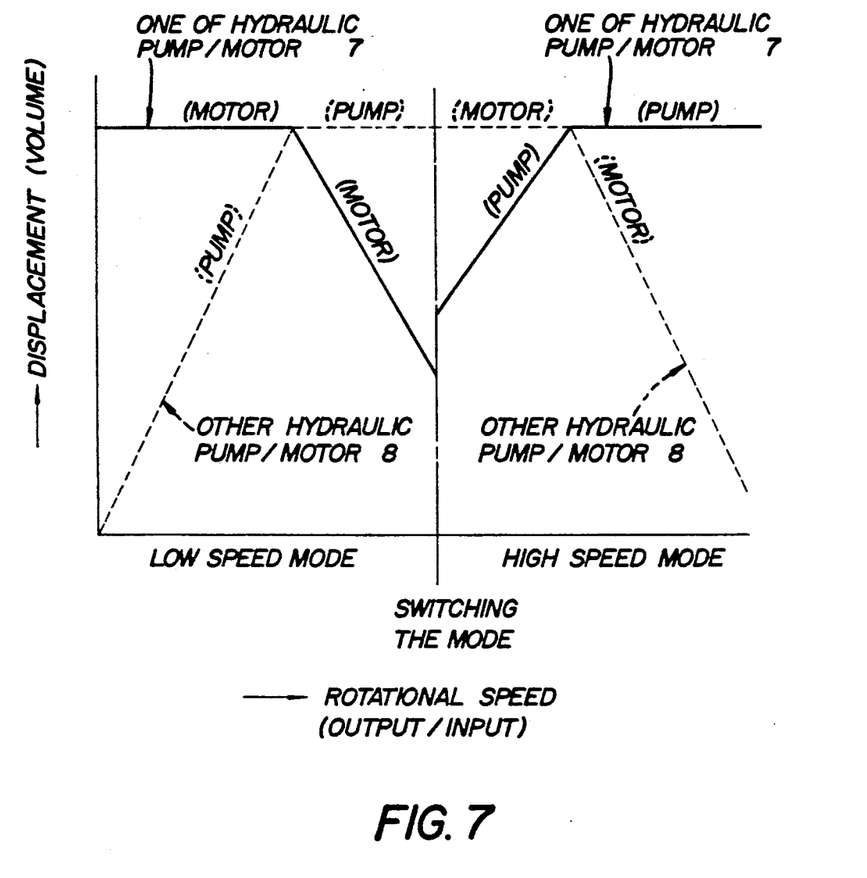
FIG. 7 is an explanatory graph showing the control patterns.

In the following, the operation of the whole of this stepless speed change gear will be described:

In the low speed mode in which the low speed synchromesh type intermittent power on-off making mechanism 14 is brought into its connected state, while holding the sleeve 44 in its engaged position, but the high speed synchromesh type power transmission mechanism 15 is in its opened state, while holding the sleeve 54 in its disengaged position, the input side and the output side are directly connected through the low speed side mechanical transmission system "a" which passes between the first and the second input/output ends 1 and 2 of the aforementioned differential gear mechanism 4. Part of the inputted power is directly transmitted to the output shaft 18 through mechanical transmission system "a". At this time, as shown in FIG. 7, one of the aforementioned hydraulic pumps/motors 7 functions as a motor, while the other hydraulic pump/motor 8 above-mentioned works as a pump. Thus, the torque at a third input/output end 3 of the aforementioned differential gear mechanism 4 is transmitted to the aforementioned output shaft 18 through a hydraulic type transmission system A formed between the aforementioned two pumps/motors 7 and 8.

In this low speed mode, the pump capacity of the other hydraulic pump/motor 8 continues to be increased and, after its capacity has reached a maximum, the motor capacity of the other hydraulic pump/motor 7 is gradually reduced, causing the rotational speed of the aforementioned output shaft 18 to increase relative to the revolution of the aforementioned input shaft 25. In other words, if the capacity of the hydraulic pump/motor 8 is zero, the third input/output end 3 of the differential gear mechanism 4 will be nearly in no load running state. Therefore, the output shaft 18 joined to the second input-output end 2 of the differential gear mechanism 4 is nearly at standstill. With increasing capacity of the aforementioned hydraulic pump/motor 8, the rotational speed of the aforementioned third input/output end 3 will relatively diminish, while the rotational speed of the second input/output end 2 will relatively increases.

At the time when the speed of the dog gear 41 connected to the transmission end of the aforementioned low speed side mechanical transmission system "a" and the dog gear 51 connected to the transmission end of the high speed side mechanical transmission system "b" become nearly equal, a switching operation, as described later, is executed and switching to the high speed mode is made.

In this high speed mode, there is formed a mechanical transmission system "b" which passes between the first and the third input/output ends 1 and 3 of the aforementioned differential gear mechanism 4, whereby part of the inputted power is directly transmitted to the output shaft 18 through mechanical transmission system "b". At this time, as shown in FIG. 7, one of the hydraulic pumps/motors 7 functions as a pump, while the other hydraulic pump/motor 8 functions as a motor. Thus the torque of the second input/output end 2 of the aforementioned differential gear mechanism is transmitted to the aforementioned output shaft 18 through a hydraulic transmission system B formed between one of the hydraulic pumps/motors 7 and the other hydraulic pump/motor 8. In the high speed mode, the rotational speed of the output shaft 18 relative to the rotational speed of the input shaft 25 will be increased by gradually increasing the pump capacity of one of the hydraulic pumps/motors and, then, gradually decreasing the motor capacity of the other hydraulic pump/motor 8, after the aforementioned pump capacity has reached its maximum.

The operation when making a switching from the low speed mode to the high speed mode is now explained. When slide shaft 63 is held in its engaged position, while setting the solenoid valve 69 in its excited position, but the slide shaft 73 is held in its disengaged position, while the solenoid valve 79 is set in its unexcited position, the low speed side synchromesh type intermittent power on-off making mechanism 14 is in its connected state, while the high speed side synchromesh type intermittent power on-off making mechanism 15 is in its opened state. In such a low speed mode, when rotational speed detectors 87 and 88 have detected that the rotational speed $R_1$ of the low speed side dog gear 41 has approached the rotational speed $R_2$ of the high speed side dog gear 51 and that the difference between them has become smaller than the preset valve $R_0$, the solenoid valve 79 will be switched to its excited position, to introduce compressed liquid into pressure chamber 78 of hydraulic actuator 5, for the system to be in its stand-by posture, while keeping the sleeve 54 depressed in its engaging direction (leftward, as seen in FIG. 2). In this way, the previously described synchronous action is performed. Thus, at the time when the aforementioned high speed side dog gear 51 is synchronized with the center boss 13, which turns integrally with the low speed side dog gear 41, the spline 55 of the high speed side sleeve 54 meshes with the teeth 51 of the high speed side dog gear 41. Thus, the high speed side synchromesh type intermittent power on-off making mechanism 15 goes into the connected state. This state may be detected by the closing of the lead switch 86. The engagement of both of the aforementioned two intermittent power on-off making mechanisms 15 is confirmed by lead switches 84 and 86. Thereafter, the hydraulic force is deenergized by switching the solenoid valve 69 to its unexcited position and the sleeve 44 is pressed in the disengaging direction (leftward, as seen in FIG. 2) by the urging force of the spring 64, for the system to be in its stand-by posture. In this state, the displacement of the hydraulic pump/motor 92 is corrected in increasing direction. As a result, the transmission torque between the sleeve 44 and, the dog gear 41 diminishes and the moment when the value has become zero, the urging force of the spring will overcome the engaging force between the sleeve 44 and the dog gear 41. When this occur, the sleeve 44 will move in its disengaging direction (leftward, as seen in FIG. 2), causing the low speed side synchromesh type intermittent power on-off making mechanism 14 to be in its opened state. Then, as shown in FIG. 3, only the high speed side synchromesh type intermittent power on-off making mechanism 15 will be in the connected state and the system will be in its high speed mode. This is indicated by the closing of lead switch 83.

For the transition from the high to the low mode, the process above described is reversed. Thus, first with the solenoid valve 69 switched to its excited position, the sleeve 44 is pressed to its engaged direction (rightward, as seen in FIG. 2), and the system is in its stand-by posture. The moment when the speed of the sleeve 44 and that of the dog gear 41 are the same, the sleeve 44 moves to its engaging position, causing the low speed side synchromesh type power on-off making mechanism 14 to be in its connected state.

In accompaniment therewith, the lead switch 84 is closed. The intermittent power on-off making mechanisms 14 and 15 are both in their connected state which is confirmed by lead switches 84 and 86. The solenoid valve 79 is switched to its unexcited position, and the system is in its stand-by posture. The volume of output hydraulic pump/motor 7 is corrected in the reducing direction.

As a result, the torque between sleeve 54 and dog clutch 51 diminishes and at the moment when its value becomes nearly zero, the sleeve 54 moves in its disengaging direction (right-ward, as seen in FIG. 2), causing the high speed side synchromesh type intermittent power on-off making mechanism 15, FIG. 3, to be in its opened state. This is detected by the closing operation of the lead switch 85, FIG. 3.

The switching between low and high speed modes are made in the aforedescribed manner. The device employs synchromesh type intermittent power on-off making mechanism 14 and 15 and uses a smaller number of parts at this switching section than are required with multiple disc clutches. On this account, the structure is simplified and the and size and weight and cost of the device are reduced.

Furthermore, the synchromesh type intermittent power on-off making mechanism 14 and 15 permits easy maintenance, and involves less abrasion of parts than multiple disc clutches.

The device of this invention eliminates the need of the delicate operation of connecting a large number of sliding clutch discs to each other. Accordingly, not only proper switching may be ensured by means of a simple switching mechanisms 61 and 71 adapted to continuous pressing of the sleeve in the required direction, but energy loss at the switching time may be effectively reduced.

Moreover, a combination of synchromesh type intermittent power on-off making mechanisms 14 and 15 and the above-described switching mechanisms 61 and 71 enable the mode switching to be positively done merely by the operation of the aforementioned switching mechanisms 61 and 71, upon detecting that the rotational speed of the transmission ends 23a and 29a of the center boss 13, FIG. 1, and the respective transmission system have approached each other, thereby continuously urging the sleeves 44 and 54, FIG. 2, in the required direction. For this reason, unlike simple dog clutches, the system of the present invention is not subject to such a limitation that the switching operation must be made simultaneously as the rotational speed of the center boss and that of the transmission end of each transmission system are brought into exact agreement by controlling, at high accuracy, the capacity of the hydraulic pump/motor. It is, therefore, possible to make reliable, desired switching, using lows priced rotational speed detectors with relatively low precision.

The composition of the synchromesh type intermittent power on-off making mechanism is not limited to the aforementioned, but various modifications are possible as by using constant load type, etc., without departing from the spirit of this invention.

The differential gear mechanism is not restricted to the planetary gear, mechanism described.

Further, the stepless speed change mechanism is not confined, as the case may be, to the HST system, as described in the aforementioned embodiment, but for example, traction drive system or belt type, systems etc., are also permissible.

Whereas in the aforementioned embodiment, an input distributed system with the differential gear mechanism arranged on the input side is described, this invention is similarly applicable to an output distributed system.

What is claimed is:

1. A stepless speed change gear comprising:
    a differential gear mechanism having a first, second and third input/output ends and forming a low speed mechanical transmission system which passes between said first and second input/output ends and a high speed mechanical transmission system which passes between said first and third input/output ends;
    a stepless speed change mechanism having first and second input/output shafts, one of said first and second input/output shafts being connected to said second input/output end of said low speed mechanical transmission system of said differential gear mechanism and the other of said input/output shafts being connected to said third input/output end of said high speed mechanical system of said differential gear mechanism;
    means for selectively increasing and decreasing the input/output to one of said input/output shafts while decreasing and increasing the output/input to the other of said input/output shafts;
    a common rotary element intermediate a transmission end of each of said low speed and high speed mechanical transmission systems;
    a low speed synchromesh type intermittent power on-off mechanism at one side of said common rotary element and having a first sleeve for engaging and disengaging said transmission end of said low speed mechanical transmission system with said one side of said common rotary element;
    a high speed synchromesh type intermittent power on-off mechanism at the other side of said common rotary element and having a second sleeve for engaging and disengaging said transmission end of said high speed mechanical transmission system with said other side of said common rotary element; and
    a switch mechanism for selectively engaging said first sleeve of low speed synchromesh power on-off mechanism with said one side of said common rotary element and disengaging said second sleeve of said high speed synchromesh power on-off mechanism with said other side of said common rotary element when the input/output speed of said input/output shafts are decreased to a low speed of said low speed synchromesh power on-off mechanism and selectively engaging said second sleeve of said high speed synchromesh power on-off mechanism with said other side of said common rotary element and disengaging said first sleeve of said low speed synchromesh power on-off mechanism with said one side of said common rotary element when the input/output speed of said input/output shafts are increased to a high speed of said high speed synchromesh power on-off mechanism.

* * * * *